United States Patent Office 3,448,056
Patented June 3, 1969

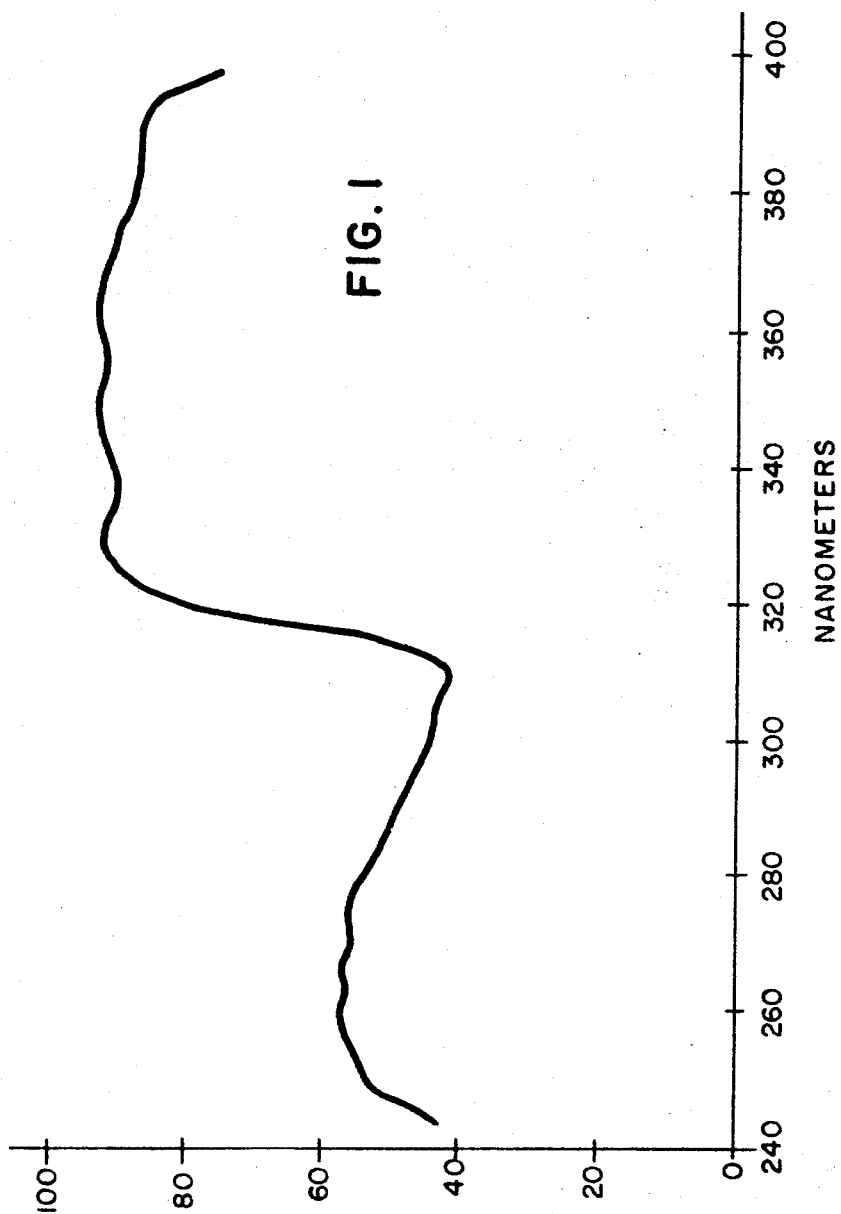

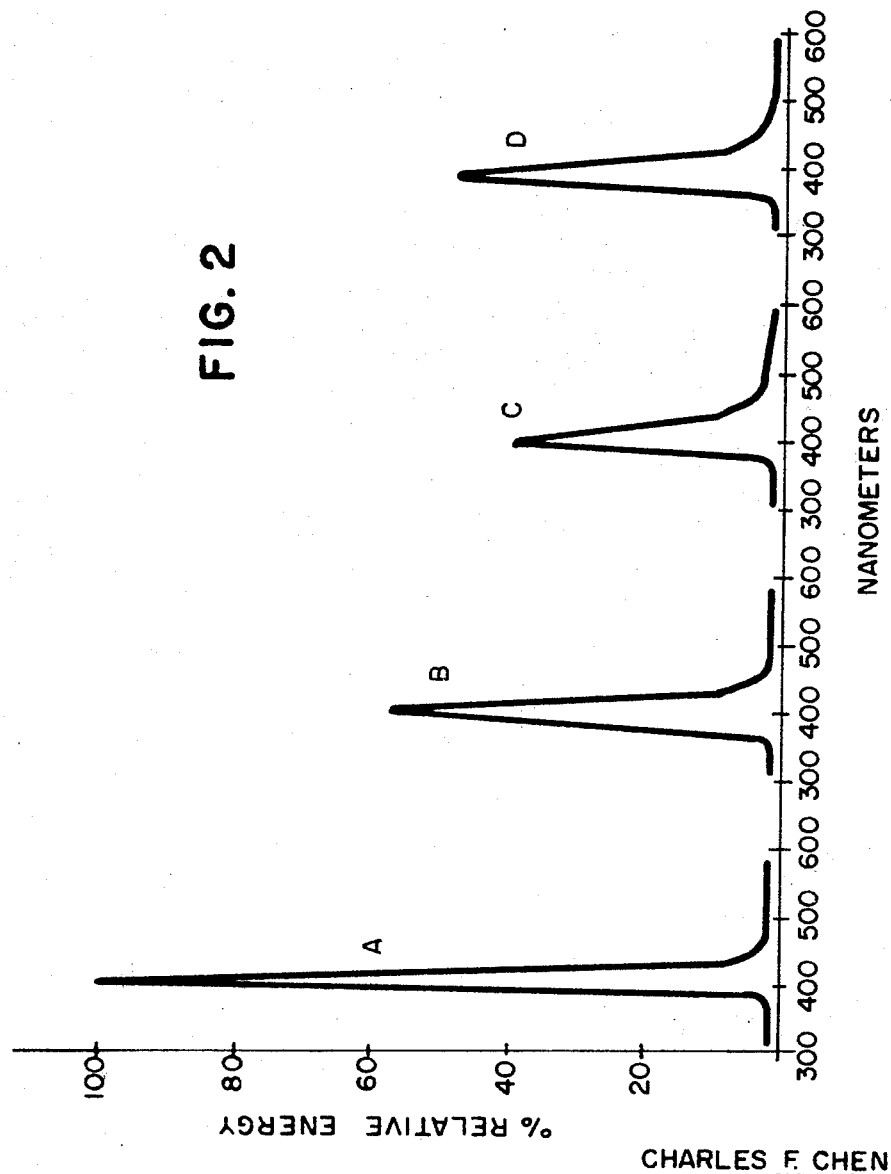

3,448,056
EUROPIUM ACTIVATED BARIUM AND STRONTIUM HALOALUMINATE PHOSPHORS
Charles F. Chenot, Towanda, Pa., assignor to Sylvania Electric Products Inc., a corporation of Delaware
Filed Apr. 27, 1966, Ser. No. 545,732
Int. Cl. C09k 1/04, 1/06, 1/10
U.S. Cl. 252—301.4            3 Claims

ABSTRACT OF THE DISCLOSURE

Blue emitting divalent europium activated barium and strontium haloaluminate phosphors for use in high or low pressure mercury vapor discharge devices.

BACKGROUND OF THE INVENTION

This invention relates to fluorescent phosphors and particularly to those which are excited to fluorescence by the discharge of low pressure or high pressure mercury arcs. Specifically, this invention relates to strontium and/or barium, chloro and/or fluoro aluminate phosphors activated by divalent europium. More speifically, this phosphor can be described as:

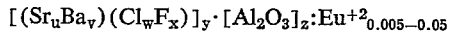

$$[(Sr_uBa_v)(Cl_wF_x)]_y \cdot [Al_2O_3]_z : Eu^{+2}{}_{0.005-0.05}$$

wherein the sum of $u$ and $v$ is about 1 and the sum of $w$ and $x$ is about 2 and the ratio of $y$ to $z$ is between about 1:1 to 1:6.

Divalent europium activated phosphors are known to the art. Probably the most widely studied of this class are divalent europium activated alkali halide crystals.

The phosphor which I have discovered has two broad excitation bands in the regions of 250 to 280 and 320 to 390 nm. Hence, they may be exicted by the low pressure mercury discharge at 253.7 nm. and the high pressure mercury discharge at 365 nm. and thus be useful in both low and high pressure electric discharge devices. The emission of the phosphor is in the blue region in the 400 nm. range.

DESCRIPTION OF THE INVENTION

FIGURE 1 of the drawings is an excitation spectra of a strontium chloroaluminate phosphor activated by divalent europium and is typical of the other phosphors in the system.

FIGURE 2 of the drawings is the spectral energy distribution curves of the following four specific phosphors which are exemplary of those encompassed by the system of this invention.

(A) $SrCl_2 \cdot 3Al_2O_3:Eu_{0.01}$
(B) $SrClF \cdot 3Al_2O_3:Eu_{0.01}$
(C) $BaCl_2 \cdot 3Al_2O_3:Eu_{0.01}$
(D) $BaClF \cdot 3Al_2O_3:Eu_{0.01}$ The phosphors of my invention have been expressed as an empirical formula determined through thermal gravimetric analyses and standard quantitative analytical techniques. They are expressed empirically because some phosphors in the system are solid solutions of the strontium and/or barium halide in aluminum oxide.

As seen in FIGURE 1, the phosphors have absorption bands in the range of 250 to 280 nm. and 320 to 390 nm. Hence they are well suited for excitation by either low pressure or high pressure discharges. As shown in FIGURE 2, small adjustments in peak shape and spectral location are observed for various adjustments in the halogen containing materials.

The following specific examples are offered as illustrations of the preparation of these phosphor systems and are not intended to be limitative upon the claims.

Example I

Strontium chloride, aluminum hydroxide, and europium oxide in the form fine powders were wet blended in acetone in the molecular proportions:

| | Moles |
|---|---|
| $SrCl_2$ (anhyd.) | 0.98 |
| $Al(OH)_3$ | 4.00 |
| $Eu_2O_3$ | 0.005 |

The mixture was dried at 160° C., reblended, and redried at 400° C. for 2 hours. Mixture was fired in an open alundum crucible at 1150° for 4 hours under 0.4% $H_2$ in $N_2$. Material was mortared and refired at 1150° C. for 2 hours under 4.0% $H_2$ in $N_2$. A colorless powdered phosphor material was obtained which gave an emission spectrum illustrated in FIGURE 2, curve (A).

Example II

Strontium chloride, strontium fluoride, aluminum hydroxide, and europium oxide in the form of fine powders were wet blended in acetone in the molecular proportions:

| | Moles |
|---|---|
| $SrCl_2$ (anhyd.) | 0.49 |
| $SrF_2$ | 0.49 |
| $Al(OH)_3$ | 4.00 |
| $Eu_2O_3$ | 0.005 |

This mixture was dried at 160° C., reblended, and redried at 400° C. for 2 hours. Mixture was fired identically to procedure indicated in Example I. A colorless powdered phosphor material was obtained which gave an emission spectrum illustrated in FIGURE 2, curve (B).

Example III

Barium chloride, aluminum hydroxide, and europium oxide in the form of fine powder were wet blended in acetone in the molecular proportions:

| | Moles |
|---|---|
| $BaCl_2$ (anhyd.) | 0.98 |
| $Al(OH)_3$ | 4.00 |
| $Eu_2O_3$ | 0.005 |

This mixture was dried at 160° C., reblended, and redried at 400° C. for 2 hours. Mixture was fired identically to procedure indicated in Example I. A colorless powdered phosphor material was obtained which gave an emission spectrum indicated in FIGURE 2, curve (B).

Example IV

Barium chloride, barium fluoride, aluminum hydroxide and europium oxide in the form of fine powders were wet blended in acetone in the molecular proportions:

| | Moles |
|---|---|
| $BaCl_2$ (anhyd.) | 0.49 |
| $BaF_2$ | 0.49 |
| $Al(OH)_3$ | 4.00 |
| $Eu_2O_3$ | 0.005 |

This mixture was dried at 160° C., reblended, and redried at 400° C. for 2 hours. The mixture was fired identically to procedure indicated in Example I. A colorless powdered phosphor material was obtained which gave an emission spectrum illustrated in FIGURE 2, curve (D).

As my invention, I claim:

1. A fluorescent material containing significant quantities of europium and having the formula:

$$[(Sr_uBa_v)(Cl_wF_x)]_y \cdot [Al_2O_3]_z:Eu$$

wherein the sum of $u$ and $v$ is about 1 and the sum of $w$ and $x$ is about 2 and wherein the ratio of $y$ and $z$ is between about 1:1 to 1:6.

2. The composition according to claim 1 wherein the Eu concentration is between about $0.005$ to $0.05$.

3. The composition according to claim 1 wherein the europium is in its divalent state.

References Cited

UNITED STATES PATENTS 3,294,699   12/1966   Lange ------------ 252—301.4

OTHER REFERENCES

Kroger: Some Aspects of the Luminescence of Solids, 1948, p. 292.

TOBIAS E. LEVOW, *Primary Examiner.*

R. D. EDMONDS, *Assistant Examiner.*